J. B. BOLDIN.
CULTIVATOR.
APPLICATION FILED JUNE 17, 1913.
1,087,270.
Patented Feb. 17, 1914.
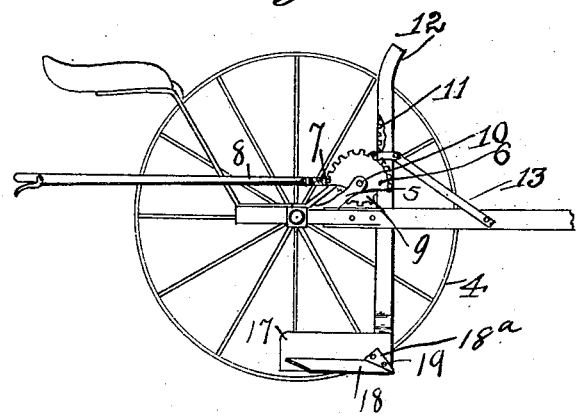
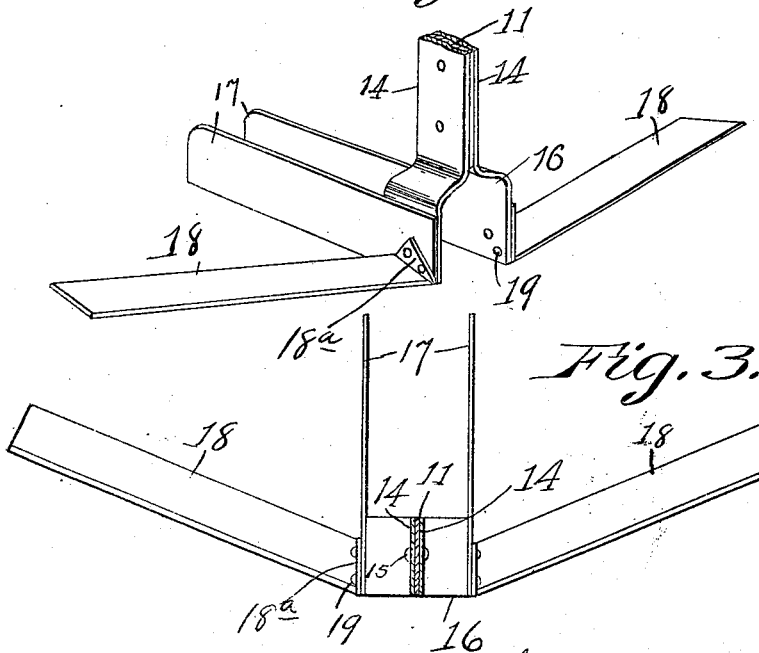

UNITED STATES PATENT OFFICE.

JONATHAN B. BOLDIN, OF LAMESA, TEXAS.

CULTIVATOR.

1,087,270. Specification of Letters Patent. Patented Feb. 17, 1914.

Application filed June 17, 1913. Serial No. 774,204.

*To all whom it may concern:*

Be it known that I, JONATHAN B. BOLDIN, a citizen of the United States of America, and resident of Lamesa, in the county of Dawson and State of Texas, have invented certain new and useful Improvements in Cultivators, of which the following is a specification.

This invention relates to devices for cultivating ground, an object of the invention being to produce novel means for removing weeds or the like from the ground between rows of plants, means being provided for causing the ground worked by the cultivator and cutter to be loosened so that it will act as a protector to prevent evaporation of moisture from beneath while at the same time destroying foreign vegetation and the like.

The invention is designed primarily in cultivating cotton, corn and similar vegetation when in its young stage, so that the plant growth may not be covered by the earth dislodged by the cultivator and cutter.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a cultivator with the invention applied thereto; Fig. 2 illustrates a perspective view showing the cultivating teeth and cutters on an enlarged scale; and Fig. 3 illustrates a top plan view of the part of the device shown in Fig. 2.

In these drawings 4 denotes a fragment of an ordinary sulky cultivator, the frame of which is provided with a bracket 5 having pivotally mounted thereon a toothed segment 6 adapted to engage a pawl 7 carried by the handle 8, the said handle 8 being connected to a pinion 9 which is likewise mounted in the bracket 5 on the pivot 10, the said pawl being in engagement with a rack 11 formed on the standard 12 which standard is guided and held in engagement with the pinion by means of the bracket 13. The standard 12 is formed of two outer strips of metal 14 and the intermediate strip forming the rack 11, the parts being connected together by appropriate fastenings such as 15 and the outer strips 14 at their lower ends diverge and are then extended downwardly to form the arch 16, which is adapted to straddle or pass over the row of vegetation being cultivated. The lower ends of the strips 14 have the parallel guards 17 attached to them, the said guards extending rearwardly and serving to prevent the dislodged earth from falling back on to the plants and the length of the guards is immaterial so long as they serve the purposes indicated.

As a means for cutting foreign vegetation such as weeds and for loosening the earth to be cultivated, the lower ends of the member 14 have the blades 18 secured to them by means of the fastenings 19, it being observed that the said blades 18 have upturned ends which lie against the outer surfaces of the guard plate 17, which guard plates are immediately in contact with the lower ends of the strips 14 so that the fastenings 19 serve to secure both the blades and the guards to the strips 14. The blades 18 are preferably set so that the front cutting edges are slightly lower than the rear edges, thus causing the earth to be forced up over the surfaces of the blades and to fall in the rear of said blades, thus providing sufficient agitation to disintegrate the earth and cause it to form a film-like layer which, as stated, will, to a great extent, prevent evaporation. The forward cutting edges of the blades may be beveled or otherwise sharpened so that weeds and the like will be cut as the blades are drawn through the earth, under cultivation; furthermore by reason of the fact that the blades extend outwardly and rearwardly, a draw cut results when the blades contact the weeds so that the effectiveness of the cutters is insured.

I claim—

1. In a cultivator, a standard having teeth, means engaging the teeth for adjusting the standard vertically, said standard including strips for diverging lower ends forming an arch, guards secured to the lower ends of the strips and blades having their inner ends anchored to the strips, the said blades extending outwardly and rearwardly and provided with cutting edges at the fronts thereof.

2. In a cultivator, a standard comprising strips and a rack, a pinion for engaging the rack, means for operating the pinion, the diverging ends of the strips forming an arch, guides extending rearwardly from the lower ends of the strips and secured thereto, and blades having angular portions secured to and carried by the said strips, said blades extending outwardly and rearwardly from the said standard.

In testimony whereof I affix my signature in the presence of two witnesses.

JONATHAN B. BOLDIN.

Witnesses:
J. E. GARLAND,
J. F. CONNER.